(No Model.)
G. R. JOWELL.
ANTI-FRICTION WAGON SLIDE.
No. 346,373. Patented July 27, 1886.
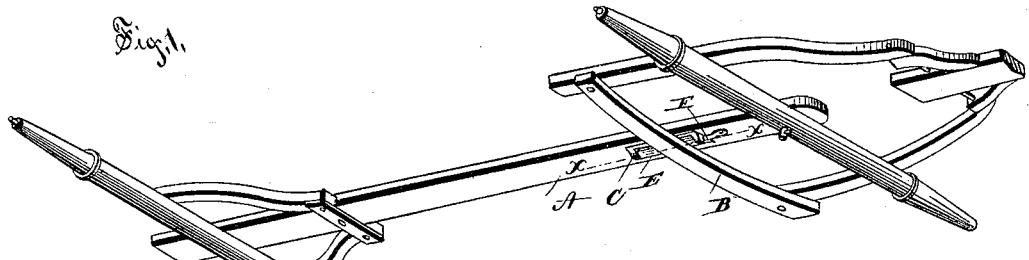
Fig. 1.
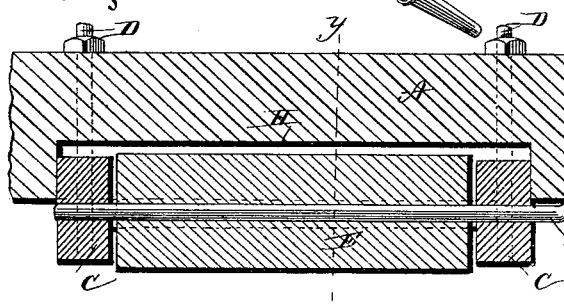
Fig. 2.
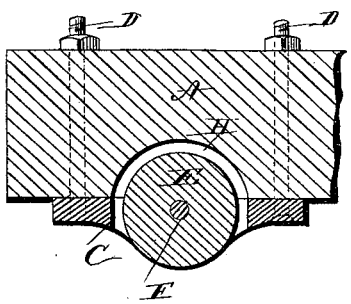
Fig. 3.
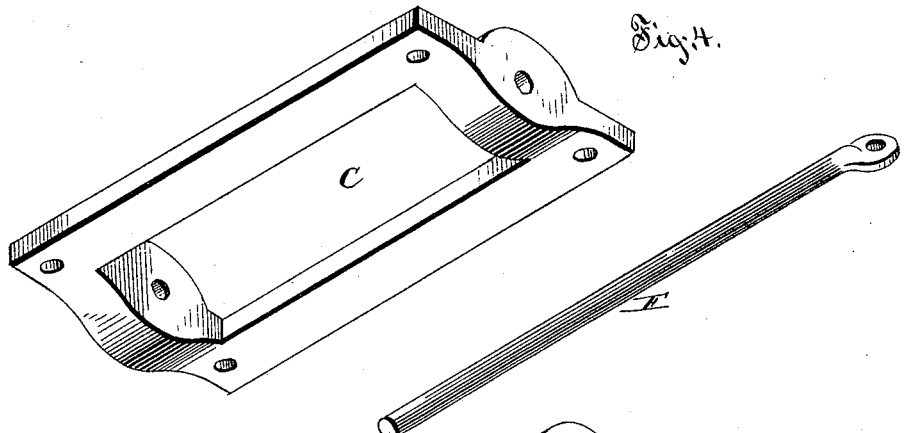
Fig. 4.
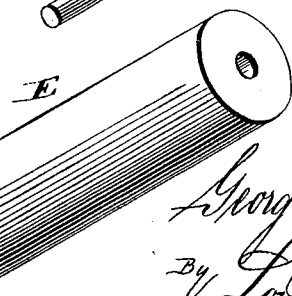
WITNESSES
F. L. Ourand
Edward Stanton
George R. Jowell
INVENTOR
By Louis Bagger & Co
Attorneys.
N. PETERS, Photo-Lithographer, Washington, D. C.

UNITED STATES PATENT OFFICE.

GEORGE RATCLIFF JOWELL, OF THORP'S SPRING, TEXAS.

ANTI-FRICTION WAGON-SLIDE.

SPECIFICATION forming part of Letters Patent No. 346,373, dated July 27, 1886.

Application filed June 8, 1886. Serial No. 204,521. (No model.)

*To all whom it may concern:*

Be it known that I, GEORGE RATCLIFF JOWELL, a citizen of the United States, and a resident of Thorp's Spring, in the county of Hood and State of Texas, have invented certain new and useful Improvements in Anti-Friction Wagon-Slides; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my anti-friction device, as applied to the under side of the coupling-tongue of a wagon. Fig. 2 is a vertical section taken on the line $x\ x$, Fig. 1. Fig. 3 is a cross-section taken on line $y\ y$, Fig. 2; and Fig. 4 is a perspective view of the separate parts of said device.

Like letters of reference indicate similar parts in the several figures.

My invention has relation to anti-friction rollers; and it consists in the improved construction and combination of parts, as will be hereinafter fully described and claimed.

Although my anti-friction device can be used in many and various combinations, I prefer to use it upon the coupling-tongue of a wagon to prevent the friction and wear between the slider and said tongue.

Referring to the accompanying drawings, A represents the coupling-tongue; B, the slider; C, the frame which receives the anti-friction roller; D, bolts for securing said frame to said tongue; E, the roller; F, the shaft upon which said roller turns; G, a screw for securing said shaft to said tongue, and H the recess in the tongue for receiving a portion of said frame and roller.

The frame is formed in one piece, and consists of flat side pieces provided with bolt-holes near their ends, and connected to diametrically-opposite points of nearly-cylindrical end pieces, which have holes through their axes for the reception of the roller-shaft. The recess H is so formed that the lower portion of the end pieces shall bear against its ends when the frame is put in place. This arrangement, together with the bolts through the corners of the frame and the coupling-tongue, prevents any tendency of the frame to displacement. It also allows the device to take up less space between the slider and the coupling-tongue. One end of the roller-shaft is bent, flattened, and provided with a screw-hole.

In assembling the parts the recess is formed, the frame bolted in place, the roller placed in the frame, the shaft passed through the holes in the ends of the frame and the roller, and a screw turned through the flattened end thereof into the coupling-tongue. In this manner the shaft is securely retained in place, whereas, if it were provided with a head at one end and screw-thread at the other, to receive a nut, or to be screwed into the end piece of the frame, the friction of said roller upon it would soon turn it out and cause both roller and shaft to be lost.

On a wagon having a double slider, one above and one below the coupling-tongue, one of my anti-friction devices would be attached to each side of said tongue.

Having thus fully described my invention, I claim and desire to secure by Letters Patent of the United States—

1. An anti-friction device consisting of a frame having registering holes in its opposite ends, a roller, and a shaft passing through said holes and said roller, and having one end flattened and perforated.

2. The combination, with the coupling-tongue and the slider of a wagon, of an anti-friction device consisting of a frame, a roller, and a shaft, one end of which is flattened and provided with a screw-hole, through which a screw is passed to secure said shaft to said tongue.

In testimony that I claim the foregoing as my own I have hereunto affixed my signature in presence of two witnesses.

GEORGE RATCLIFF JOWELL.

Witnesses:
A. G. DABNEY,
T. F. RAWLIN.